US010641276B2

(12) United States Patent
Okabe et al.

(10) Patent No.: US 10,641,276 B2
(45) Date of Patent: May 5, 2020

(54) IMPELLER

(71) Applicant: MITSUBISHI HEAVY INDUSTRIES, LTD., Tokyo (JP)

(72) Inventors: Ryoji Okabe, Tokyo (JP); Yasunori Watanabe, Tokyo (JP); Kosuke Ikeda, Tokyo (JP)

(73) Assignee: MITSUBISHI HEAVY INDUSTRIES, LTD., Tokyo (JP)

(*) Notice: Subject to any disclaimer, the term of this patent is extended or adjusted under 35 U.S.C. 154(b) by 297 days.

(21) Appl. No.: 15/544,072

(22) PCT Filed: Nov. 12, 2015

(86) PCT No.: PCT/JP2015/005651
§ 371 (c)(1),
(2) Date: Jul. 17, 2017

(87) PCT Pub. No.: WO2016/135788
PCT Pub. Date: Sep. 1, 2016

(65) Prior Publication Data
US 2018/0266427 A1   Sep. 20, 2018

(30) Foreign Application Priority Data
Feb. 24, 2015   (JP) .................. 2015-033677

(51) Int. Cl.
F04D 29/02   (2006.01)
B29C 45/00   (2006.01)
(Continued)

(52) U.S. Cl.
CPC ........ F04D 29/023 (2013.01); B29C 45/0005 (2013.01); B29C 45/73 (2013.01);
(Continued)

(58) Field of Classification Search
CPC . F04D 29/023; F04D 29/284; B29C 45/0005; B29C 45/73; B29C 2045/7343;
(Continued)

(56) References Cited

U.S. PATENT DOCUMENTS 4,597,926 A * 7/1986 Ando .................. F01D 5/048
                                              264/645
4,692,099 A * 9/1987 Homma ............. B29D 99/0025
                                              29/889.21
(Continued)

FOREIGN PATENT DOCUMENTS

JP   3-267599 A     11/1991
JP   03267599 A  *  11/1991
(Continued)

OTHER PUBLICATIONS

Machine translation of JP-03267599-A (Year: 1991).*
(Continued)

Primary Examiner — Justin D Seabe
Assistant Examiner — Brian Christopher Delrue
(74) Attorney, Agent, or Firm — Birch, Stewart, Kolasch & Birch, LLP

(57) ABSTRACT

The purpose of the present invention is to improve the mechanical strength of a boss in correspondence with the direction in which the principal stress is generated in an impeller formed of fiber-reinforced resin. A hub 11 is provided with a first region α arranged on the back surface 11b side, and a second region β arranged on the front surface 11a side. In the first region α the frequency with which the reinforcement fibers F dispersed at the periphery of a boss hole 12 are oriented inclined with respect to the radial direction of the hub 11 is high, and in the second region the frequency with which the reinforcement fibers dispersed at the periphery of the boss hole are oriented along the rotational axis line is high.

15 Claims, 9 Drawing Sheets

(51) Int. Cl.
*B29C 45/73* (2006.01)
*F04D 29/28* (2006.01)
*F02B 39/00* (2006.01)
*B29K 101/12* (2006.01)
*B29K 105/14* (2006.01)
*B29L 31/08* (2006.01)
*F02B 33/40* (2006.01)

(52) U.S. Cl.
CPC .... *F04D 29/284* (2013.01); *B29C 2045/7343* (2013.01); *B29K 2101/12* (2013.01); *B29K 2105/14* (2013.01); *B29L 2031/08* (2013.01); *F02B 33/40* (2013.01); *F02B 39/00* (2013.01); *F05D 2300/43* (2013.01); *F05D 2300/44* (2013.01); *F05D 2300/603* (2013.01)

(58) Field of Classification Search
CPC .... B29C 2045/0006; B29C 2045/0008; B29K 2101/12; B29K 2105/14; B29K 2105/145; B29L 2031/08; F02B 33/40; F02B 39/00; F05D 2300/43; F05D 2300/44; F05D 2300/603
USPC .......................................................... 416/230
See application file for complete search history.

(56) References Cited

U.S. PATENT DOCUMENTS

| | | | | |
|---|---|---|---|---|
| 4,751,123 A * | 6/1988 | Broquere | ............... | B23P 15/006 29/889.2 |
| 4,966,527 A * | 10/1990 | Merz | ..................... | B29C 70/202 416/230 |
| 5,464,325 A | 11/1995 | Albring et al. | | |
| 5,840,399 A * | 11/1998 | Kozel | ..................... | B29C 70/24 428/102 |
| 5,951,255 A * | 9/1999 | Krenkel | ................ | F04D 29/181 416/230 |
| 7,938,627 B2 * | 5/2011 | Muller | ...................... | F01D 5/34 29/889.2 |
| 2004/0013521 A1 * | 1/2004 | Yamada | .................. | F01D 5/025 415/216.1 |
| 2017/0211583 A1 * | 7/2017 | Kozel | ..................... | B29C 70/34 |

FOREIGN PATENT DOCUMENTS

| | | |
|---|---|---|
| JP | 7-49099 A | 2/1995 |
| JP | 7-71201 A | 3/1995 |
| JP | 2667544 B2 | 10/1997 |
| JP | 3018853 B2 | 3/2000 |
| JP | 2005-54692 A | 3/2005 |
| JP | 2014-237301 A | 12/2014 |

OTHER PUBLICATIONS

International Preliminary Report on Patentability and Written Opinion of the International Searching Authority (Forms PCT/IB/338, PCT/IB/373, PCT/ISA/237 and PCT/IB/326) issued in International Application No. PCT/JP2015/005651 dated Sep. 8, 2017, together with an English translation.
Japanese Office Action issued in Japanese Application No. 2015-033677 dated Apr. 25, 2017, together with an English translation.
Japanese Office Action issued in Japanese Application No. 2015-033677 dated Aug. 8, 2017, together with an English translation.

* cited by examiner

IMPELLER

TECHNICAL FIELD

The present invention relates to an impeller configured of a fiber-reinforced resin.

BACKGROUND ART

Initially, a main object of a turbocharger (a turbine-type turbocharger) which is mounted on a commercially available automobile is to increase output of an engine having a relatively large displacement. However, from the viewpoint of an environmental protection, a demand for a turbocharger increases in order to compensate for output of an engine having a small displacement as a tendency toward an automobile having a small displacement increases. Meanwhile, it is preferable to decrease so-called specific turbo lag of a turbo vehicle.

In order to decrease the turbo lag, decreasing weight of an impeller of a turbocharger to decrease inertia moment is effective, and until now, adoption of a ceramic material in which weight can be significantly decreased compared to a metal material is reviewed, and, as described in PTL 1 and PTL 2, adoption of a fiber-reinforced resin is also reviewed.

CITATION LIST

Patent Literature

[PTL 1] Japanese Patent No. 2667544
[PTL 2] Japanese Patent No. 3018853

SUMMARY OF INVENTION

Technical Problem

In an impeller for a turbocharger, principal stress due to rotation is generated in a peripheral direction around a boss hole to which a rotating shaft is fitted.

Accordingly, an object of the present invention is to improve mechanical strength around boss hole in correspondence with a direction in which principal stress is generated in an impeller configured of a fiber-reinforced resin.

Solution to Problem

According to an aspect of the present invention, there is provided an impeller, including: a hub which includes a front surface side, a back surface side, and a boss having a boss hole formed along a rotational axis line of the impeller; and a plurality of blades which are provided on the front surface side of the hub, in which the impeller is configured of a resin in which reinforced fibers are dispersed, and the boss includes a first region which is disposed on the back surface side, and a second region which is disposed on the front surface side.

In addition, in the impeller of the present invention, in the first region, a frequency with which the reinforced fibers dispersed around the boss hole are oriented to be inclined in a radial direction of the hub is high, and in the second region, a frequency with which the reinforced fibers dispersed around the boss hole are oriented along the rotational axis line is high.

In the first region of the impeller of the present invention, preferably, the reinforced fibers oriented to be inclined in the radial direction of the hub are also oriented with respect to the rotational axis line or the first region includes a position in the direction of the rotational axis line at which an outer diameter of the hub is maximum.

In addition, in the impeller of the present invention, preferably, the impeller includes 0.1 to 30 mass % of thermoplastic elastomer.

Advantageous Effects of Invention

According to the present invention, in the first region, since the frequency with which the reinforced fibers dispersed around the boss hole are oriented to be inclined in a radial direction of the hub is high, strength with respect to principal stress generated in the peripheral direction when the impeller rotates is secured. In addition, in the second region, since the frequency with which the reinforced fibers dispersed around the boss hole are oriented along the rotational axis line is high, it is possible to secure strength with respect to a compressive force along the rotational axis line generated when the impeller is fixed by fastening a bolt.

DESCRIPTION OF EMBODIMENTS

Hereinafter, the present invention will be described in detail based on an embodiment shown in the accompanying drawings.

Figure 9:
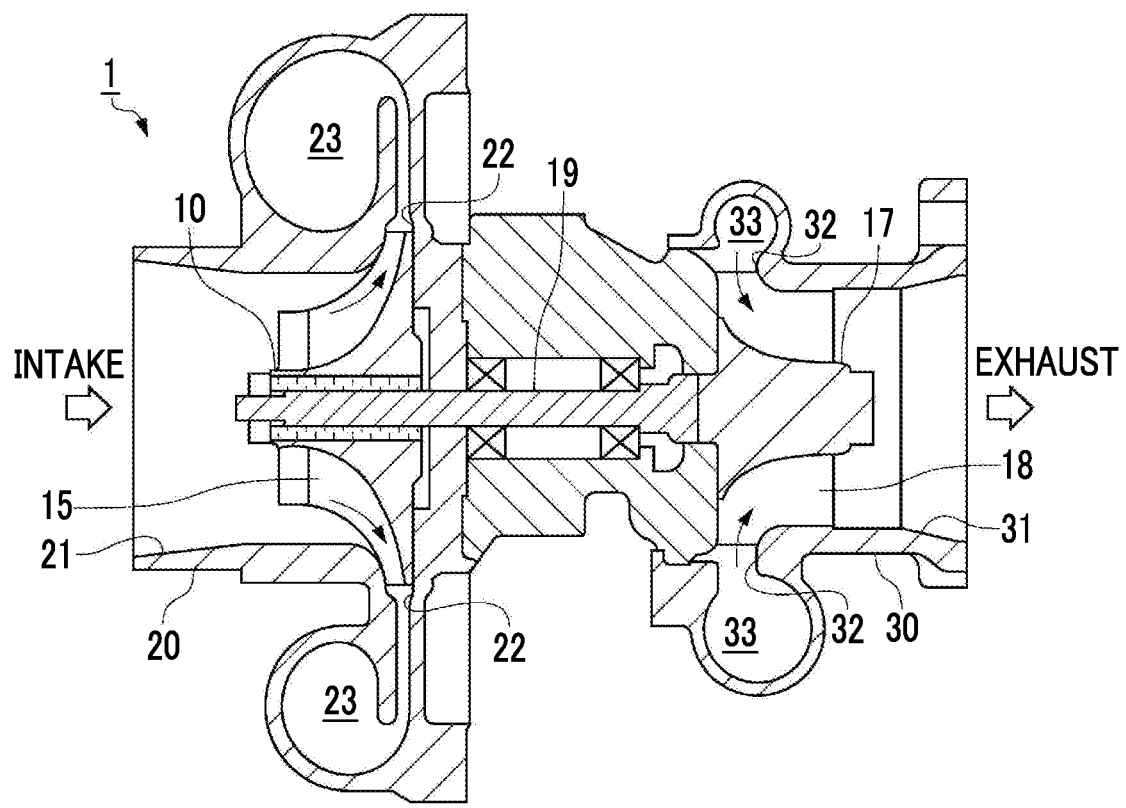
FIG. 9 is a longitudinal sectional view showing a turbocharger to which the impeller of the present embodiment is applied.

An impeller of the present embodiment is applied to a turbocharger 1 shown in FIG. 9.

The turbocharger 1 includes a turbine impeller 17 which receives an exhaust gas and rotates, and a compressor impeller 10 which rotates following the turbine impeller 17, performs intake and compression, and feeds compressed air to a cylinder of an engine (not shown).

The compressor impeller 10 and the turbine impeller 17 are connected to each other so as to be integrally rotated by a shaft 19 which is rotatably journaled inside the turbocharger 1.

The compressor impeller 10 is accommodated inside a compressor housing 20.

The compressor housing 20 includes a suction opening 21 for introducing an intake gas on a front surface side of the compressor impeller 10 and a compressor passage 23 which spirally extends on an outer periphery of the compressor impeller 10. The compressor passage 23 is connected to a discharge port 22 which is open to the outer peripheral portion of the compressor impeller 10.

The turbine impeller 17 is accommodated in a turbine housing 30.

The turbine housing 30 includes a scroll passage 33 which spirally extends on the outer periphery of the turbine impeller 17. An exhaust gas discharged from an internal combustion engine is introduced to the scroll passage 33, and as shown by an arrow in FIG. 9, the exhaust gas having a turning force while passing through the scroll passage 33 is sprayed to a turbine blade 18 of the turbine impeller 17 through an introduction port 32 formed in an inner surface of the scroll passage 33. In this way, the turbine impeller 17 is rotated by the sprayed exhaust gas. In addition, the exhaust gas sprayed to the turbine impeller 17 is discharged through the discharge port 31 which is open to the front surface side of the turbine impeller 17.

The rotation of the turbine impeller 17 is transmitted through the shaft 19, and if the compressor impeller 10 is rotated, an intake gas is suctioned through the suction opening 21. The suctioned intake gas is compressed by the compressor blade 15 provided in the compressor impeller 10 and is forcibly fed to the compressor passage 23 through the discharge port 22. The intake gas fed to the compressor passage 23 is fed to a cylinder (not shown) of an internal combustion engine and supercharging is performed.

The compressor impeller 10 according to the present embodiment is characterized in that the compressor impeller 10 is formed by injection molding a fiber-reinforced resin. However, first, a schematic configuration of the compressor impeller 10 will be described.

Figure 1A:
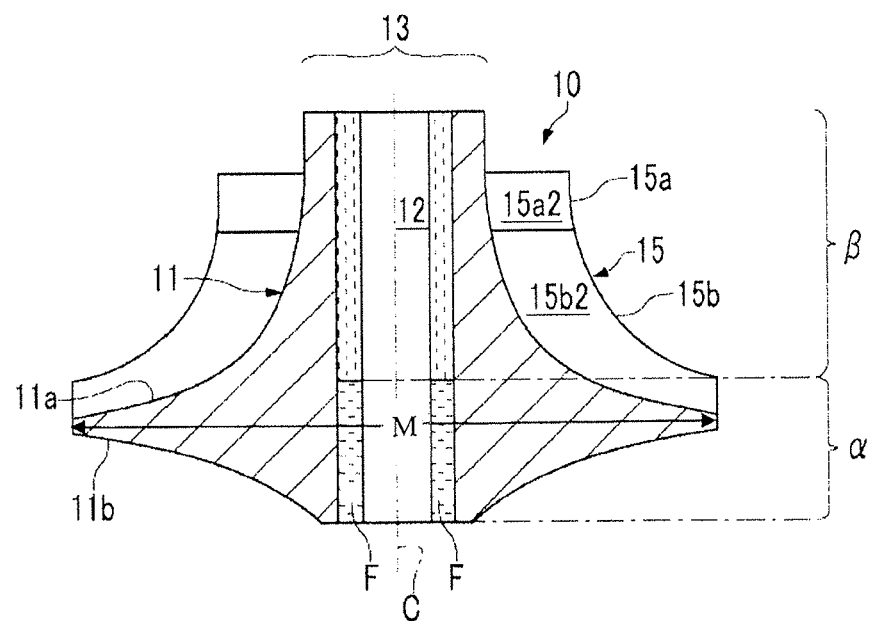
FIG. 1A is a longitudinal sectional view showing an impeller according to the present embodiment and FIG. 1B is a back view showing the impeller.
Figure 1B:
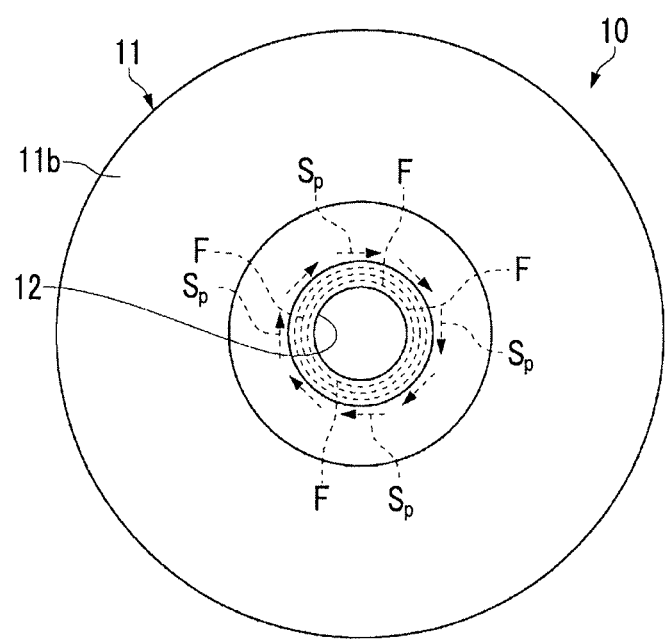

As shown in FIGS. 1A and 1B, the compressor impeller 10 includes a disk-shaped hub 11 which is provided to be coaxial with a shaft 19 shown in FIG. 9, and a plurality of van-shaped compressor blades 15 which are erected from one surface side of the hub 11 and form a flow passage of an intake gas. In addition, in the compressor impeller 10, a side on which the compressor blades 15 are provided is defined as a front surface 11a, and a side opposite to the front surface 11a is defined as a back surface 11b. Moreover, in the compressor impeller 10, a side close to a rotational axis line C is referred to as an inner diameter side, and a side far from the rotational axis line C is referred to an outer diameter side.

The hub 11 is curved such that the front surface 11a continuously protrudes from the outer diameter side toward the inner diameter side. The hub 11 includes a boss hole 12 to which the shaft 19 is fitted and a boss 13 which surrounds the rotational axis line C of the compressor impeller 10 around the boss hole 12.

In the present embodiment, the compressor blades 15 include two kinds of blades such as long blades 15a and short blades 15b, and the long blades 15a and the short blades 15b are alternately arranged.

The compressor impeller 10 is formed of a fiber-reinforced resin, and, particularly, has characteristics with respect to an orientation of reinforced fibers F in the boss 13.

In order to form the compressor impeller 10 by the fiber-reinforced resin, a molten resin including reinforced fibers is injected along the rotational axis line C. Accordingly, since the reinforced fibers F are oriented along an injection direction in a so-called skin layer around the boss hole 12, the reinforced fibers F are oriented along the rotational axis line C as they are.

However, in the compressor impeller 10 according to the present embodiment, in a portion corresponding to the skin layer of the boss 13 surrounding the vicinity of the boss hole 12, the compressor impeller 10 includes two portions in which orientation directions are different from each other. That is, in the present embodiment, when viewed from a cross section in a rotation axial direction, as shown in FIG. 1A, an orientation region (hereinafter, first region α) in which the reinforced fibers F are inclined in the radial direction of the boss 13 (hub 11) and an orientation region (hereinafter, second region β) in which the reinforced fibers F are oriented along the rotational axis line C of the boss 13 (hub 11) are provided.

In general, in the fiber-reinforced resin, mechanical strength (for example, tensile strength) in the same direction as the direction in which the reinforced fibers are oriented high, but the mechanical strength in the direction orthogonal to the orientation direction of the reinforced fibers is low.

During the rotation of the compressor impeller 10, as shown in FIG. 1B, principal stress $S_P$ is generated in the portion of the boss 13 of the compressor impeller 10 in the peripheral direction. Particularly, in the first region α, since the outer diameter of the hub 11 is large and the thickness is thick, larger principal stress $S_P$ than that of the second region β is generated. Here, in order to cope with the principal stress $S_P$ generated due to the rotation in strength, the reinforced fibers F are oriented to be inclined in the radial direction like to the first region α, and strength with respect to the principal stress $S_P$ is secured. The first region α includes a position in the direction of the rotational axis line C at which the outer diameter of the hub 11 is maximum.

Meanwhile, the compressor impeller 10 is fixed by fastening a bolt. However, compressive stress is generated in the portion of the boss 13 along the rotational axis line C due to the fastening. Since the compressive stress is handled preferential to the principal stress $S_P$ in the second region β, in the second region β, the reinforced fibers F are oriented along the rotational axis line C.

Figure 2A:
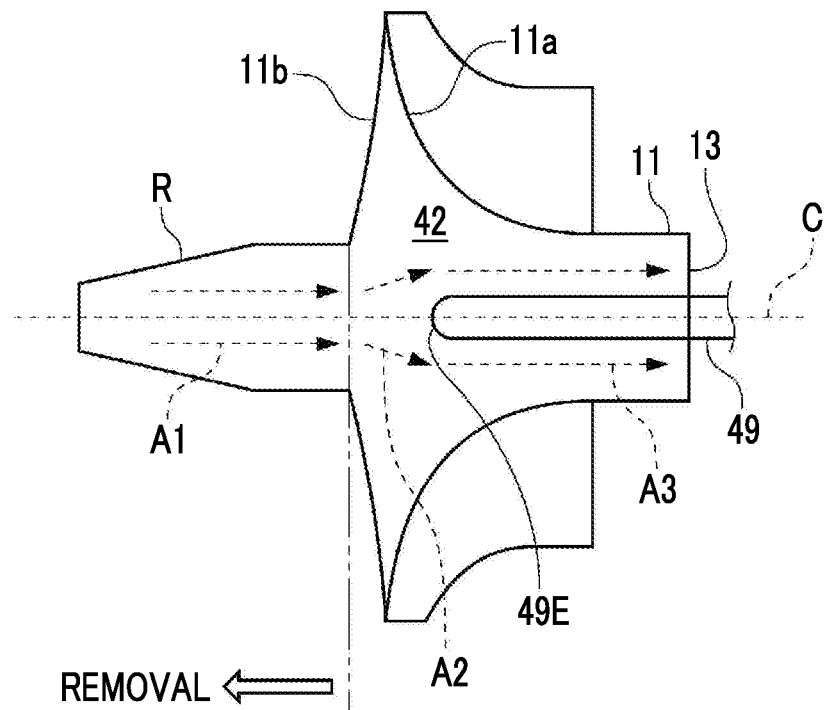
FIGS. 2A and 2B are view for explaining a method of obtaining a first region and a second region according to the present embodiment.
Figure 2B:
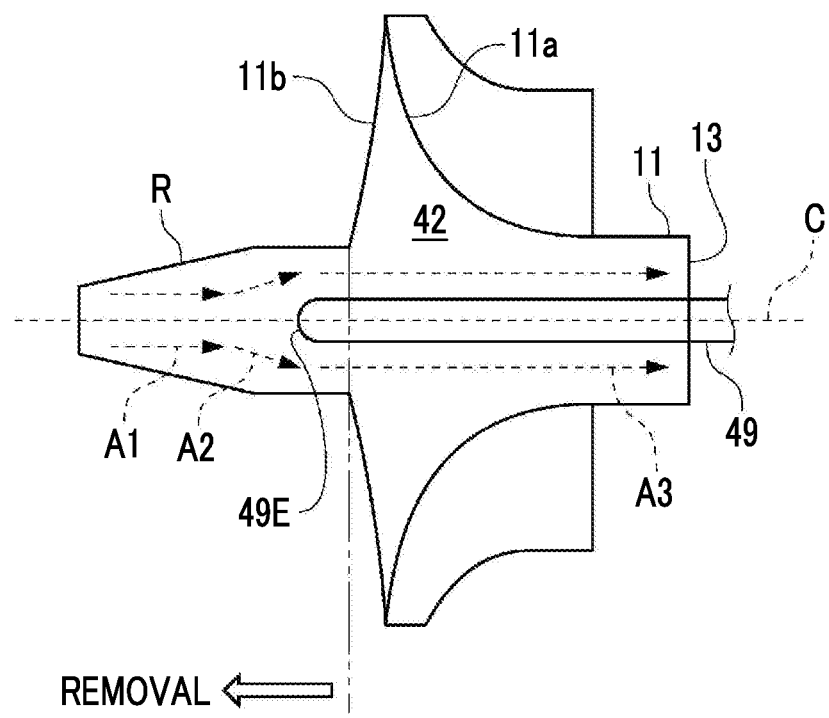

If the molten resin including the reinforced fibers is injected along the rotational axis line C, since the reinforced fibers F are oriented along the rotational axis line C, the second region β is relatively obtained easily. However, in order to obtain the first region α, a particular treatment is required. Hereinafter, it will be described with reference to FIGS. 2A and 2B. In addition, FIGS. 2A and 2B show a cavity 42 and an outer diameter of a sprue R for molding the compressor impeller 10. However, for the sake of explanation, reference numerals in the compressor impeller 10 are assigned to portions corresponding to the compressor impeller 10.

In the present embodiment, when the compressor impeller 10 is injection-molded, a flow of a molten resin in which the reinforced fibers F are oriented to be inclined in the radial direction of the boss 13 is generated in a region corresponding to the first region α. Specifically, in the present embodiment, in the middle of the injection molding, a length of a center pin 49 disposed so as to correspond to the boss hole 12 is specified. Hereinafter, FIG. 2A and FIG. 2B are compared with each other and described in detail. In addition, in FIG. 2A, according to the present embodiment, the center pin 49 does not penetrate the boss 13, and a tip 49E is positioned at a position which is deviated to the front surface 11a side by a predetermined dimension from the back surface 11b. Meanwhile, in FIG. 2B, the center pin 49 is provided so as to penetrate the boss 13 in the direction of the rotational axis line C. In addition, in FIGS. 2A and 2B, arrows A1 to A3 indicated by broken lines shows directions in which the molten resin flows. Moreover, it is assumed that the center pin 49 is inserted from the front surface 11a side of the compressor impeller 10.

In general, when a molten resin including reinforced fibers is injected to a flat plate-shaped cavity, the followings are known as an orientation of the fibers.

Since shearing stress is applied to the vicinity of the cavity wall surface of the molten resin which is in a flow condition, that is, a portion corresponding to the skin layer, the reinforced fibers in the molten resin are oriented in the flow direction of the molten resin. Meanwhile, since shearing stress is not applied to the vicinity of a center in a thickness direction separated from the cavity wall surface, that is, a portion corresponding to a core layer, the reinforced fibers of the molten resin are oriented in the direction orthogonal to the flow direction of the molten resin. That is, since the reinforced fibers are oriented in the direction orthogonal to flow direction in the center portion of the thickness of a molded part, a phenomenon occurs, in which the reinforced fibers are oriented in a width direction in the center portion of the thickness of the flat plate-shaped molded part and the reinforced fibers are randomly oriented in a columnar cross section in the center portion of the thickness of the columnar molded part. The present invention uses this phenomenon.

First, in the examples shown in FIG. 2A, since the center pin 49 does not exist in the region corresponding to the first region α, the fibers of the boss 13 are randomly oriented in the cross section of the rotational axis line C, and fibers are oriented in the direction of the rotational axis line C around the boss hole due to the shearing stress on the outer peripheral surface of the center pin 49 in the region corresponding to the second region β.

Meanwhile, in the case of FIG. 2B, fibers are oriented in the direction of the rotational axis line C around the boss hole due to the shearing stress on the outer peripheral surface of the center pin 49 in the region corresponding to the first region α, and it is possible to provide regions in which the orientations in the fiber of the boss 13 are different from each other according to the tip 49E of the center pin 49.

Here, in each of FIGS. 2A and 2B, the left side in the drawing from a two-dot chain line is the sprue R which is a path through which the molten resin passes, and the sprue R is removed by processing after the injection molding. That is, an injection-molded body which remains as the compressor impeller 10 is the right side of the drawing from the two-dot chain line. Here, if FIG. 2A and FIG. 2B are compared with each other, in FIG. 2A in which the center pin 49 does not penetrate the boss, that is, in the present embodiment, the region in which the molten resin flows in the radial direction exists within the range of the compressor impeller 10, and in FIG. 2B in which the center pin 49 penetrates the boss, the region in which the molten resin flows in the radial direction is removed and does not remain in the compressor impeller 10.

As described above, it is possible to obtain the compressor impeller 10 in which the first region α and the second region β coexist by adjusting the insertion depth of the center pin 49.

Figure 3A:
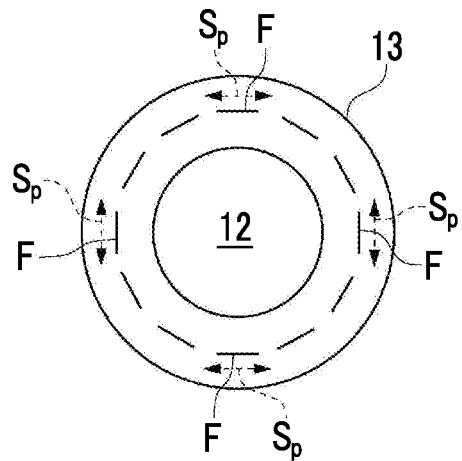
FIGS. 3A to 3C are views showing an orientation example of reinforced fibers in the first region according to the present embodiment.

As shown in FIG. 1B and FIG. 3A, the aspect in which the reinforced fibers F are oriented in the peripheral direction is the most preferable orientation aspect for the first region α. However, actually, all reinforced fibers F are not oriented in the peripheral direction.

Figure 3B:
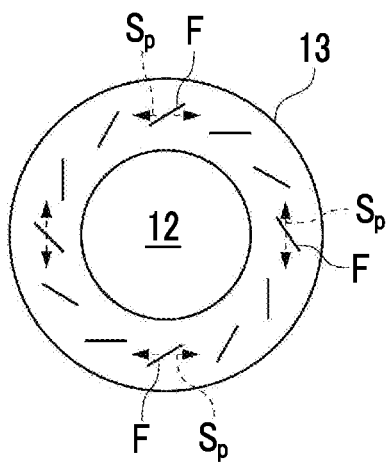
Figure 3C:
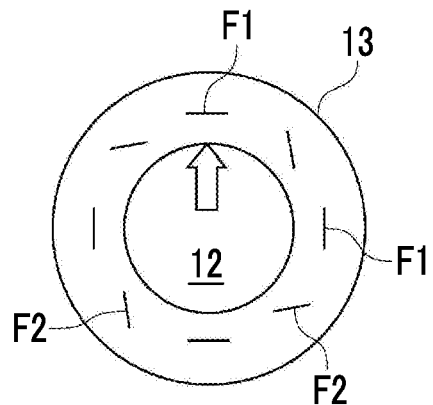

Accordingly, for example, as shown in FIG. 3B, the reinforced fibers F may be oriented to be inclined in the radial direction of the boss 13 in the cross section of the boss 13. In the case of the inclination orientation, since the reinforced fibers F intersect the principal stress $S_P$, it is possible to secure strength with respect to the principal stress $S_P$. Moreover, in the present embodiment, as shown in FIG. 3C, reinforced fibers F1 which are oriented in the peripheral direction and reinforced fibers F2 which are oriented to be inclined may be mixed, and the orientation of the present embodiment is the inclined orientation which includes both.

As described above, in the present invention, since the reinforced fibers F are oriented to be inclined in the radial direction of the boss 13 in the first region α, the strength with respect to the principal stress $S_P$ is improved.

The angle of the inclination is a range which is more than 0° and equal to or less than 90° (orthogonal). However, since the strength with respect to the principal stress $S_P$ as the inclination angle increases, preferably, the inclination angle is 30° or more, and more preferably, 50° or more, and most preferably, 70°.

Figure 4A:
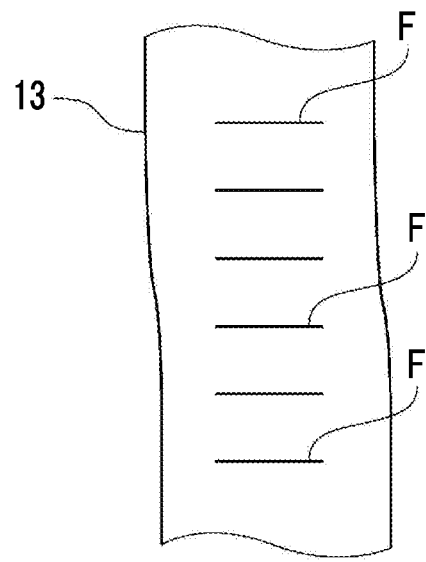
FIGS. 4A and 4B are views showing an orientation example of the reinforced fibers in the first region according to the present embodiment.
Figure 4B:
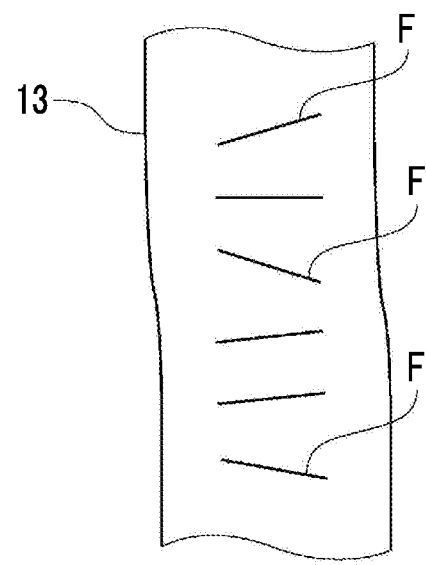

In the first region α of the present invention, the improvement of the strength with respect to the principal stress $S_P$ is mainly caused by the inclining the reinforced fibers F in the cross section of the boss 13 in the radial direction of the boss 13. Descriptions with respect to the longitudinal section are as follows. As shown in FIG. 4A, the reinforced fibers F may be oriented so as to be orthogonal to the rotational axis line C, and in addition, as shown in FIG. 4B, the reinforced fibers F may be oriented so as to be inclined to the rotational axis line C.

Hereinbefore, the first region α and the second region β are respectively described in the present embodiment. However, in a boundary portion between the first region α and the second region β, the orientations of the reinforced fibers F of both are mixed. That is, the boss 13 in the present embodiment is configured of the first region α in which a frequency of the reinforced fibers F oriented to be inclined in the radial direction of the hub 11 is high, the second region β in which a frequency of the reinforced fibers oriented in the direction of the rotational axis line C is high, and a third region which is provided between the first region α and the second region β and in which the reinforced fibers F oriented to be inclined and the reinforced fibers F oriented in the direction of the axis line are mixed with each other.

In the present embodiment, the orientation of the reinforced fibers F on the portion of the hub 11 around the boss 13 is arbitrary. However, in the fiber-reinforced resin, in the region on the outer diameter side of the skin layer, the orientation of the reinforced fibers F is random, and the reinforced fibers F oriented so as to be inclined are considerably included. Accordingly, in the corresponding portion, the random orientation may be used as it is.

The resin (base material) and the reinforced fibers F configuring the compressor impeller 10 are arbitrary. Since the base material is subjected to injection molding, a thermoplastic resin is used. A well known resin can be used, for example, a general-purpose resin such as polypropylene or polyethylene, engineering plastic having heat-resistant such as polyamide or polycarbonate, or the like can be used. Moreover, in general, the temperature of the compressed air increases according to an increase in the rotation of the compressor impeller 10 of the turbocharger, and the temperature of the compressor impeller 10 also increases. Accordingly, preferably, the resin configuring the compressor impeller 10 is configured of a heat-resistant thermoplastic resin having an appropriate glass transition temperature with respect to the reaching temperature of the compressor impeller 10 when the rotation increases. In addition, as the reinforced fibers F, known fibers such as known reinforced fibers, for example, glass fibers, carbon fibers, or the like can be used.

Preferably, the content of the reinforced fibers F is a range from 5 mass to 60 mass %, and more preferably, is a range from 25 mass % to 45 mass %.

The reinforced fibers F having the same fiber length can be used. However, the reinforced fibers F having a relatively short fiber length and the reinforced fibers F having a relatively long fiber length can be mixed with each other.

In addition, in the compressor impeller 10, thermoplastic elastomer can be added in addition to the thermoplastic resin and the reinforced fibers F. Since the compressor impeller 10 includes the thermoplastic elastomer, ductility of the fiber-reinforced resin is improved, sensitivity with respect to occurrence of cracks can be reduced, compressibility of the molten resin at a high pressure during injection molding increases, expansion to compensate for cooling and solidification shrinkage can be secured, and occurrence of tensile residual stress or cracks is prevented. According to study of the present inventors, in a case where the thermoplastic elastomer of 0.1 to 30 mass % is contained, it is possible to decrease the tensile residual stress or cracks.

In addition, in a case where a depression is provided on the back surface 11b of the hub 11 to decrease the thickness of the hub 11, since an absolute value of shrinkage of a molten resin during the injection molding decreases, it is possible to prevent occurrence of the tensile residual stress or cracks.

[Manufacturing Method]

Hereinafter, the above-described compressor impeller 10 is manufactured by forming the fiber-reinforced resin using an injection molding machine having a fixed mold and a movable mold.

The injection molding machine includes a mold clamping device and a plasticizing device. The mold clamping device includes a fixed die outlet plate to which the fixed mold is attached and a movable die plate to which the movable mold is attached, the movable die plate is moved by operating a hydraulic cylinder for opening and closing a mold, and the movable mold firmly abuts on the fixed mold so as to clamp the mold. A cavity which is a gap for molding the compressor impeller 10 is formed inside the mold which includes the movable mold and the fixed mold.

The plasticizing device includes a tubular plasticizing cylinder, a screw which is provided inside the plasticizing cylinder, and a supply portion to which reinforced fibers and a resin material are loaded. In the supply portion, a portion for loading the reinforced fibers and a portion for loading the resin material can be individually provided.

The resin material is melted by rotating the screw, and a molten resin in which the reinforced fibers F are dispersed is injected to the cavity inside the mold held by the mold clamping device.

Hereinafter, a mold 40 suitable for molding the compressor impeller 10 will be described with reference to FIG. 5. The mold 40 according to the present embodiment is characterized in that directional cooling can be performed when the compressor impeller 10 is injection-molded. In addition, only main portions of the mold 40 are shown.

Figure 5:
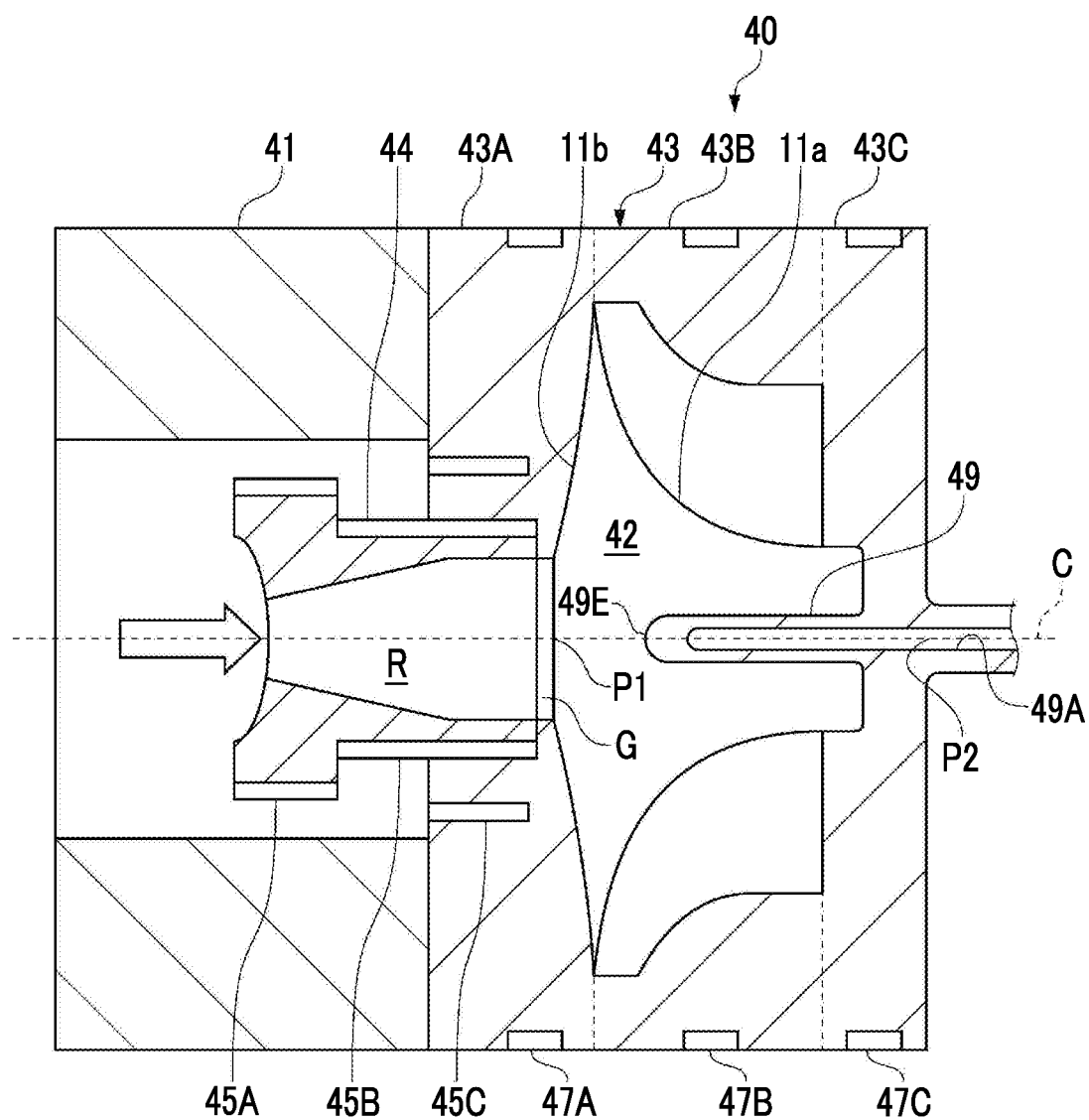
FIG. 5 is a longitudinal sectional view showing a main portion of a mold clamping device which molds the impeller according to the present embodiment.

As shown in FIG. 5, the mold 40 a fixed mold 41 which is fixed to a fixed die outlet plate (not shown) and a movable mold 43 which is attached to a movable die plate (not shown), and the movable die plate is moved by operating a hydraulic cylinder for opening and closing a mold, and the movable mold 43 firmly abuts on the fixed mold 41 so as to clamp the mold. A cavity 42 which is a gap for molding the compressor impeller 10 is formed between the movable mold 43 and the fixed mold 41. A sprue mold 44 which forms the sprue is attached to the movable mold 43 and a molten resin from the plasticizing device is supplied to the cavity 42 via the sprue mold 44. In addition, as shown by broken lines, the movable mold 43 is divided into a first element 43A, a second element 43B, and a third element 43C according to the shape of the compressor impeller 10.

The sprue mold 44 has a cylindrical shape and a first heater 45A and a second heater 45B are provided along the outer periphery of the sprue mold 44. The first heater 45A and the second heater 45B are provided to maintain a necessary temperature while the molten resin supplied from the plasticizing device passes through the sprue R.

In addition, a third heater 45C outside the second heater 45B is provided inside the movable mold 43. The third heater 45C is inserted into an annular groove which is formed in the movable mold 43. The third heater 45C is provided so as to mainly maintain the temperature of the molten resin passing through a gate G continuing to the cavity 42 to a necessary temperature.

As described above, the first heater 45A, the second heater 45B, and the third heater 45C are provided on the upstream side to which the molten resin is supplied. In addition, the component such as the first heater 45A, the second heater 45B, and the third heater 45C are arbitrary, and a known heating method such as a heater which has a heating wire as a heating element or flowing heated oil or pressurized water to a temperature adjustment circuit which is installed in the mold can be applied.

Next, a first cooling water passage 47A, a second cooling water passage 47B, and a third cooling water passage 47C are provided in the vicinity of the outer periphery of the movable mold 43. The first cooling water passage 47A, the second cooling water passage 47B, and the third cooling water passage 47C are provided so as to cool the molten resin supplied to the cavity 42 from the periphery of the cavity 42 by circulating a cooling water supplied from a supply source (not shown) through the passages. In addition, the first cooling water passage 47A, the second cooling water passage 47B, and the third cooling water passage 47C are respectively provided in the first element 43A, the second element 43B, and the third element 43C, and can cause the cooling water to selectively flow.

Moreover, in the movable mold 43, the center pin 49 is inserted into the center portion of the movable mold 43 to form the boss hole 12 in the compressor impeller 10. The center pin 49 is inserted from the front surface 11a side. However, the center pin 49 does not penetrate the cavity 42 and remains inside the cavity 42 such that the tip 49E is retracted from the back surface 11b side. The reason is as described above.

A fourth cooling water passage 49A is formed inside the center pin 49, and the cooling water supplied from a supply source (not shown) circulates through the fourth cooling water passage 49A to cool the molten resin supplied to the cavity 42 from the center of the molten resin.

As described above, the movable mold 43 includes mechanisms which cool the cavity 42 from both the outer peripheral side and the inner peripheral side, and the cooling mechanism from the outer peripheral side includes a cooling mechanism which can independently perform cooling in the axial direction.

Next, a method of obtaining the compressor impeller 10 by injection molding while performing directional cooling will be described with reference to FIGS. 6, 7A, and 7B.

Here, if a side on which the sprue mold 44 is provided is defined as a gate (front surface) side P1 and a side opposite to the gate side is defined as an anti-gate (back surface) side P2, the directional cooling according to the present embodiment means that a temperature gradient is provided such that a temperature increases from the anti-gate side P2 toward the gate side P1, in other words, a temperature gradient is provided such that a temperature decreases from the gate side P1 toward the anti-gate side P2. In order to realize this direction cooling, the operations of the first heater 45A, the second heater 45B, the third heater 45C, the first cooling water passage 47A, the second cooling water passage 47B, the third cooling water passage 47C, and the fourth cooling water passage 49A are controlled.

Figure 6:
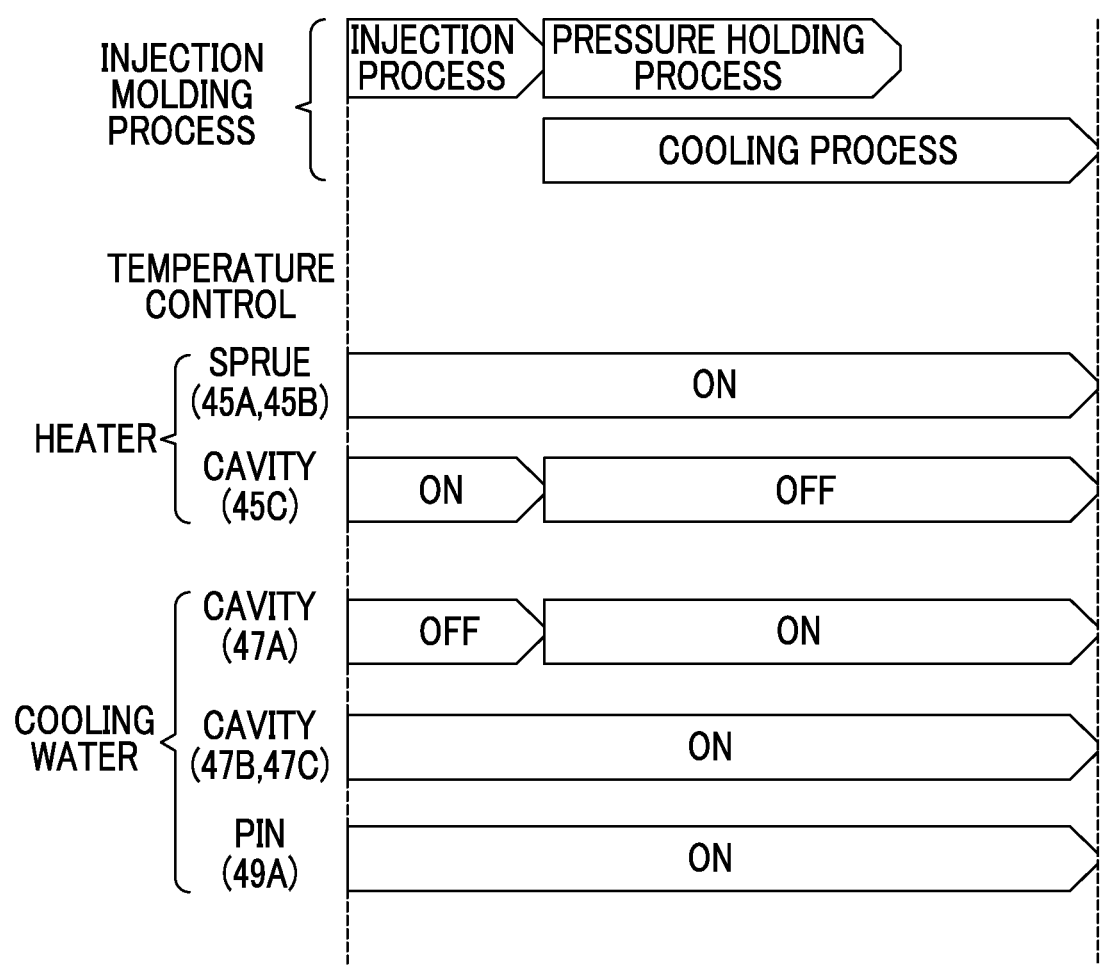
FIG. 6 is a timing chart showing a procedure of heating and cooling of a mold of FIG. 5 when the impeller of the present embodiment is molded using the mold.

As shown in FIG. 6, a series of processes of the injection molding includes an injection process of filling the cavity 42 with a molten resin, and a pressure holding process of applying a required pressure to the molten resin inside the cavity 42 after the cavity 42 is filled with the molten resin. Heating performed by the heaters and cooling performed by the cooling water are controlled according to the processes, and a process after the injection process may be referred to as a cooling process in which the injected molten resin is cooled.

Figure 7A:
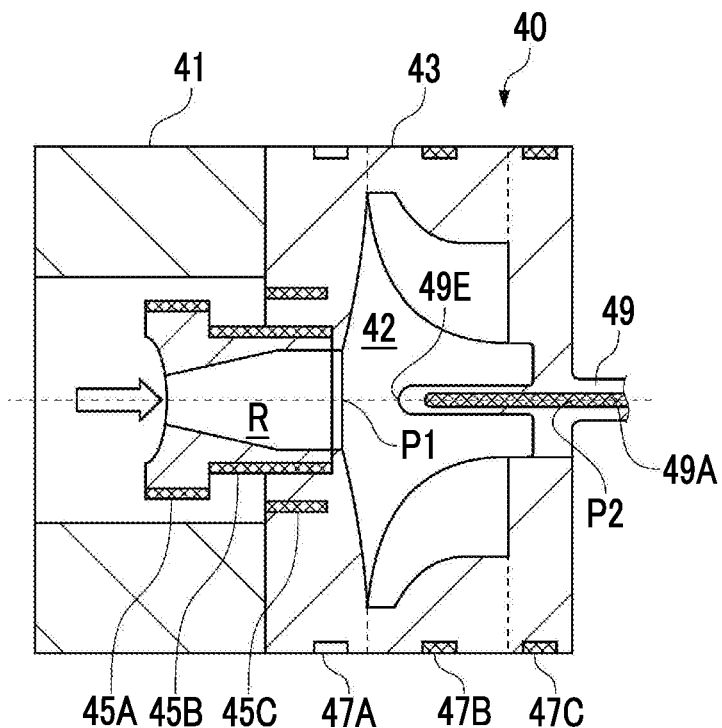
FIGS. 7A and 7B are views showing the procedure of heating and cooling of the mold of FIG. 5 when the impeller of the present embodiment is molded using the mold.

As shown in FIGS. 6 and 7A, in the injection process, the first heater 45A, the second heater 45B, and the third heater 45C are in a heated state (ON in FIG. 6). Meanwhile, the cooling water circulates (ON in FIG. 6) through the second cooling water passage 47B, the third cooling water passage 47C, and the fourth cooling water passage 49A except for the first cooling water passage 47A. In this way, in the injection process, the temperature of the region close to the gate side P1 of the cavity 42 is maintained high. Moreover, in FIGS. 7A and 7B, half-tone dot meshing is applied to the heaters which are in the heated state, and white blanks are applied to the heaters which are not in the heated state. Similarly, half-tone dot meshing is applied to the cooling water passages through which the cooling water circulates, and white blanks are applied to the cooling water passage through which the cooling water does not circulate.

Figure 7B:
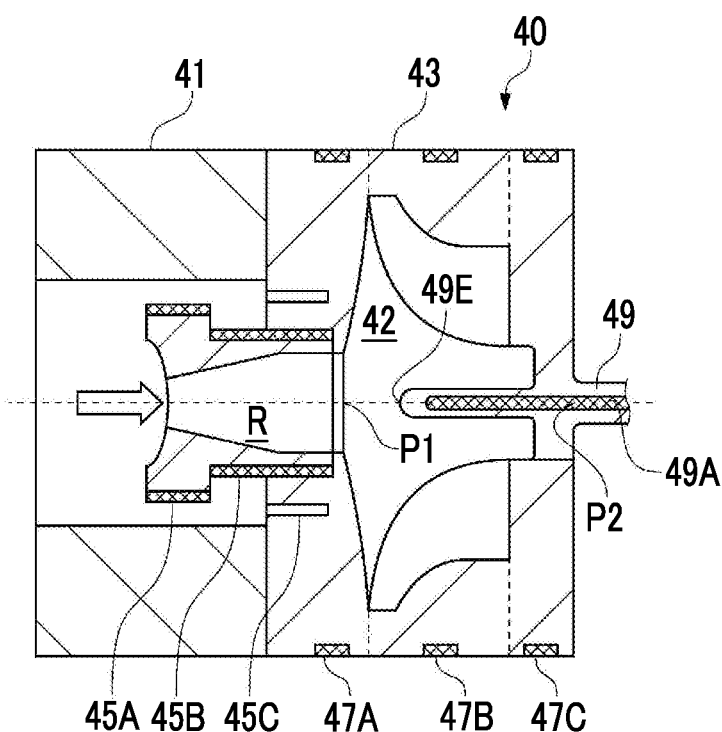

Next, if the process proceeds from the injection process to the pressure holding process, as shown in FIGS. 6 and 7B, the heating by the third heater 45C stops (OFF in FIG. 6), and the cooling water circulates (ON in FIG. 6) through the first cooling water passage 47A. Accordingly, the regions in which the temperatures are maintained in the injection process are cooled. The state is maintained during a predetermined time after the pressure holding process is completed to complete the cooling process, and thereafter, the mold is open so as to extract the compressor impeller 10.

Next, effects of the above-described procedure will be described.

The heating by the heaters and the cooling by the cooling water are controlled to apply a temperature gradient, cooling of the molten resin from the anti-gate side P2 is performed, and shrinkage according to a decrease in the temperature of the molten resin occurs on the anti-gate side P2. Meanwhile, since the gate side P1 is heated and the pressure thereof is maintained and the shrinkage with respect to the anti-gate side P2 can be replenished with the molten resin from the gate side P1, it is possible to prevent occurrence of internal tensile stress or cracks due to the shrinkage.

Next, from the time point at which the filling of the molten resin ends and the injection process is completed, the cooling water circulates through the first cooling water passage 47A, cooling in the axial line direction is applied from the anti-gate side P2 to the gate side P1, and cooling proceeds from the outer diameter side of the cavity 42 toward the center side thereof in the radial direction of the compressor impeller 10. Therefore, according to the present embodiment, with respect to the shrinkage of the molten resin in the radial direction, since the shrinkage can be replenished with the molten resin from the gate side P1, it is possible to prevent occurrence of internal tensile stress or cracks due to the shrinkage. In addition, the cooling water flows in the first cooling water passage 47A with a time difference, cooling of the gate G and the region around the gate G starts, cooling and solidification of the resin immediately below the gate G proceed, and a final cooling and solidification position can be positioned inside the gate G. Accordingly, it is possible to prevent occurrence of tensile residual stress or cracks of the thick portion.

In addition, according to the direction cooling, if the front surface 11a of the hub 11 which is initially cooled and the back surface 11b which is initially heated are compared with each other, surface roughness of the back surface 11b is smaller. In the injection molding, in a case where the molten resin is injected in a state where the temperature of the mold is high, transfer properties on the mold wall surface of the resin molded part are improved, and it is known that surface smoothness of the molded part is remarkably improved on a smooth mirror finished mold. Accordingly, in the present embodiment, since the injection molding is performed in a state where the temperature of the mold on the back surface 11b side is high, the surface smoothness of the back surface 11b is improved. This can decrease heat generated by friction between the compressor impeller 10 and air when the compressor impeller 10 rotates. Particularly, in order to prevent leakage of compressed air, since the back surface 11b side is assembled with a slight gap between the back surface 11b and a fixed surface of a bearing housing and rotates at a high speed, a temperature is easily increased on the back surface 11b due to friction heat generation of air compared to the front surface 11a. Accordingly, the heat generation is effectively decreased by performing the directional cooling according to the present embodiment.

Figure 8:
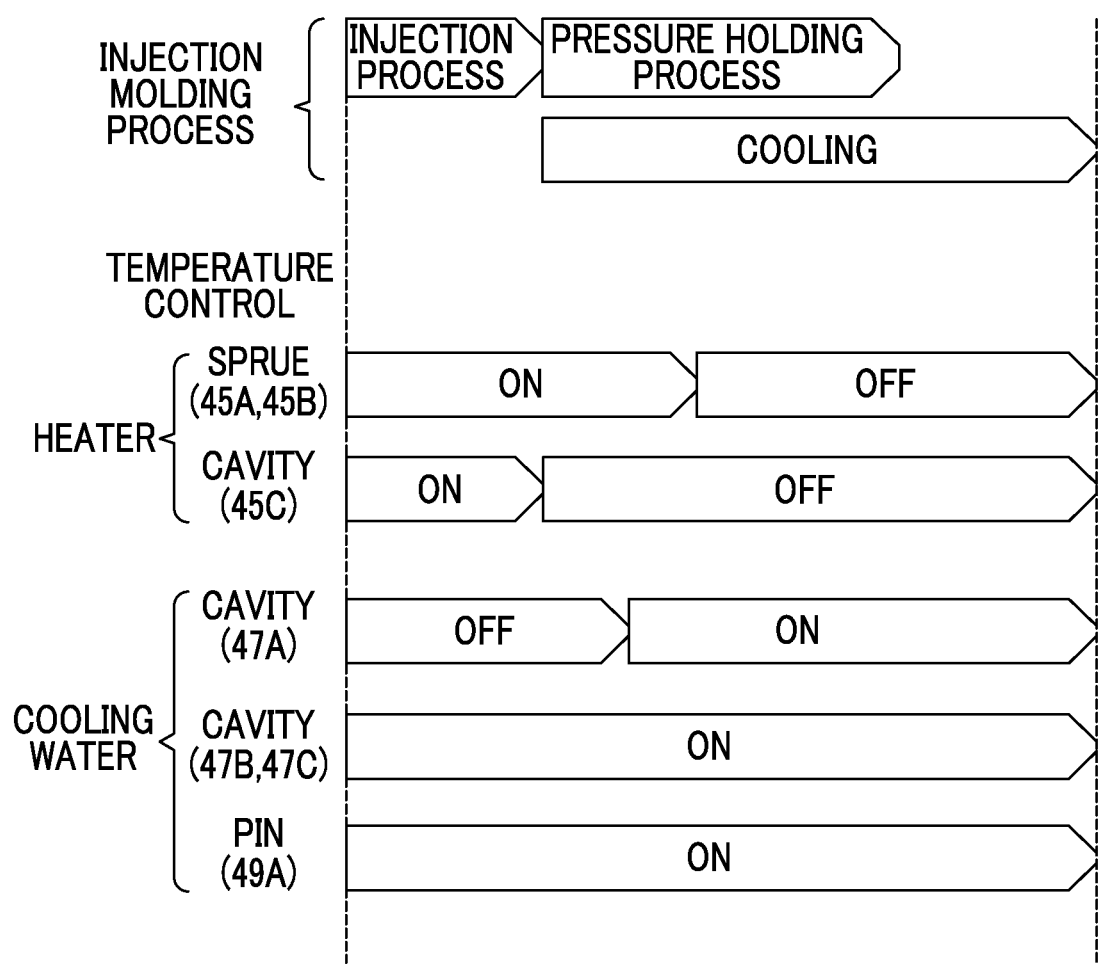
FIG. 8 is a modification example of FIG. 6.

In the present embodiment, the conditions of the heating by the heaters and the cooling by the cooing water can be changed as shown in FIG. 8.

According to the conditions shown in FIG. 8, until the cooling water flows into the first cooling water passage 47A and the cooling of the gate G starts, the injection pressure is held (pressure holding process), and the molten resin from the gate side P1 can be sequentially pushed with respect to the shrinkage of the molded part. Accordingly, it is possible to replenish the molten resin with respect to the shrinkage and prevent occurrence of stress or cracks at the final cooling and solidification position of the part portion immediately below the gate G.

In the present embodiment, the injection pressure in the pressure holding process is arbitrary. However, preferably, the injection pressure is 140 MPa or more, and more preferably, is 200 MPa or more. Accordingly, replenishment of the molten resin having viscosity or an amount of compression of the molten resin is secured, it is possible to secure an amount of expansion by replenishment with respect to the cooling and solidification shrinkage, and it is possible to effectively prevent tensile stress or cracks.

In addition, in the pressure holding process, it is preferable to continuously hold the temperature of the resin in the vicinity of the gate G within a temperature range between a melting point of the resin and a glass transition temperature. Accordingly, since it is sufficient to hold the pressure only in the temperature range where the flow of the resin is possible, power for maintaining the pressure of the injection shaft is minimized, which contributes to energy saving.

Hereinbefore, preferred embodiments of the present invention are described. However, it is possible to select the configurations described in the above embodiments or to appropriately change the configurations into other configurations as long as they do not deviate from the gist of the present invention.

For example, the present invention is not limited to the impeller which includes two kinds of blades such as long blades and short blades with respect to the inclination orientation of the reinforced fibers F, and the present invention can be applied to an impeller having only one kind of blades.

In addition, hereinbefore, the compressor impeller 10 is described as an impeller. However, the present invention can be applied to a turbine impeller or other impellers.

REFERENCE SIGNS LIST

1: turbocharger
10: compressor impeller
11: hub
11a: front surface
11b: back surface
12: boss hole
13: boss
15: compressor blade
15a: long blade
15b: short blade
17: turbine impeller
18: turbine blade
19: shaft
20: compressor housing
21: suction opening
22: discharge port
23: compressor passage
30: turbine housing
31: discharge port
32: introduction port
33: scroll passage
40: mold
41: fixed mold
42: cavity
43: movable mold
43A: first element
43B: second element
43C: third element
44: sprue mold
45A: first heater
45B: second heater
45C: third heater
47A: first cooling water passage
47B: second cooling water passage
47C: third cooling water passage
49: center pin
49A: fourth cooling water passage
49E: tip
C: rotational axis line
$S_P$: principal stress
α: first region
β: second region

The invention claimed is:

1. An impeller, comprising:
a hub which includes a front surface side, a back surface side, and a boss having a boss hole formed along a rotational axis line of the impeller; and
a plurality of blades which are provided on the front surface side of the hub,
wherein the impeller is configured of a resin in which reinforced fibers are dispersed,
wherein the boss includes
a first region which is disposed on the back surface side, and
a second region which is disposed on the front surface side,
wherein in the first region, a frequency with which the reinforced fibers, dispersed around the boss hole and adjacent to an inner surface of the boss hole, are oriented to be inclined in a radial direction in a cross section of the hub is higher than a frequency with which the reinforced fibers, dispersed around the boss hole and adjacent to the inner surface, are oriented in a direction along the rotational axis line, and
wherein in the second region, a frequency with which the reinforced fibers, dispersed around the boss hole and adjacent to the inner surface, are oriented in the direction along the rotational axis line is higher than a frequency with which the reinforced fibers, dispersed around the boss hole and adjacent to the inner surface, are oriented to be inclined in the radial direction in the cross section of the hub.

2. The impeller according to claim 1,
wherein the first region includes a position in the direction of the rotational axis line at which an outer diameter of the hub is maximum.

3. The impeller according to claim 2,
wherein the reinforced fibers oriented to be inclined in the radial direction in the cross section of the hub in the first region are also oriented to be inclined with respect to the rotational axis line.

4. The impeller according to claim 2,
wherein the impeller includes 0.1 to 30 mass % of thermoplastic elastomer.

5. The impeller according to claim 2,
wherein in the first region, the reinforced fibers oriented to be inclined in the radial direction in the cross section of the hub are oriented to be orthogonal to the rotational axis line in a longitudinal section of the hub.

6. The impeller according to claim 2,
wherein in the first region, the reinforced fibers oriented to be inclined in the radial direction in the cross section of the hub are oriented to be inclined with respect to the rotational axis line in a longitudinal section of the hub.

7. The impeller according to claim 1,
wherein the reinforced fibers oriented to be inclined in the radial direction in the cross section of the hub in the first region are also oriented to be inclined with respect to the rotational axis line.

8. The impeller according to claim 7,
wherein the impeller includes 0.1 to 30 mass % of thermoplastic elastomer.

9. The impeller according to claim 7,
wherein in the first region, the reinforced fibers oriented to be inclined in the radial direction in the cross section of the hub are oriented to be orthogonal to the rotational axis line in a longitudinal section of the hub.

10. The impeller according to claim 7,
wherein in the first region, the reinforced fibers oriented to be inclined in the radial direction in the cross section of the hub are oriented to be inclined with respect to the rotational axis line in a longitudinal section of the hub.

11. The impeller according to claim 1,
wherein the impeller includes 0.1 to 30 mass % of thermoplastic elastomer.

12. The impeller according to claim 11,
wherein in the first region, the reinforced fibers oriented to be inclined in the radial direction in the cross section of the hub are oriented to be orthogonal to the rotational axis line in a longitudinal section of the hub.

13. The impeller according to claim 11,
wherein in the first region, the reinforced fibers oriented to be inclined in the radial direction in the cross section of the hub are oriented to be inclined with respect to the rotational axis line in a longitudinal section of the hub.

14. The impeller according to claim 1,
wherein in the first region, the reinforced fibers oriented to be inclined in the radial direction in the cross section of the hub are oriented to be orthogonal to the rotational axis line in a longitudinal section of the hub.

15. The impeller according to claim 1,
wherein in the first region, the reinforced fibers oriented to be inclined in the radial direction in the cross section of the hub are oriented to be inclined with respect to the rotational axis line in a longitudinal section of the hub.

* * * * *